(12) United States Patent
Lam et al.

(10) Patent No.: US 6,630,416 B1
(45) Date of Patent: Oct. 7, 2003

(54) FRICTION MATERIAL FORMED BY DEPOSITION OF FRICTION MODIFIERS ON HIGH, WET ENERGY CARBONACEOUS FRICTION MATERIALS

(75) Inventors: Robert C. Lam, Naperville, IL (US); Yih Fang Chen, Lisle, IL (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 09/707,274

(22) Filed: Nov. 6, 2000

(51) Int. Cl.$^7$ ................................................. D04H 3/00
(52) U.S. Cl. ...................... 442/417; 442/73; 442/101; 442/148; 442/74; 428/304.4; 428/332; 428/364; 428/367; 428/292.1; 427/203; 427/386; 427/201
(58) Field of Search ................... 427/203, 326, 427/386, 387, 201, 389.4; 428/283, 290, 304.4, 323, 332, 364, 367, 368, 372, 396, 292.1; 442/73, 75, 74, 101, 148, 169, 60, 417

(56) References Cited

U.S. PATENT DOCUMENTS

| | | | |
|---|---|---|---|
| 4,451,590 A | * | 5/1984 | Fujimaki et al. |
| 5,083,650 A | * | 1/1992 | Seiz et al. |
| 5,453,317 A | * | 9/1995 | Yesnik |
| 5,529,666 A | * | 6/1996 | Yesnik |
| 5,639,804 A | | 6/1997 | Yesnik |
| 5,676,577 A | | 10/1997 | Lam et al. |
| 5,707,905 A | | 1/1998 | Lam et al. |
| 5,753,356 A | | 5/1998 | Lam et al. |
| 5,775,468 A | | 7/1998 | Lam et al. |
| 5,856,244 A | | 1/1999 | Lam et al. |
| 5,858,883 A | | 1/1999 | Lam et al. |
| 5,958,507 A | | 9/1999 | Lam et al. |
| 5,998,307 A | | 12/1999 | Lam et al. |
| 6,001,750 A | | 12/1999 | Lam |
| 6,130,176 A | | 10/2000 | Lam et al. |
| 6,182,804 B1 | | 2/2001 | Lam |
| 6,194,059 B1 | | 2/2001 | Yesnik |

FOREIGN PATENT DOCUMENTS

| | | |
|---|---|---|
| EP | 0 766 019 A1 | 4/1997 |
| EP | 0 807 766 A1 | 11/1997 |
| EP | 1 039 168 A1 | 9/2000 |
| WO | WO 98/09093 | 3/1998 |

OTHER PUBLICATIONS

International Search Report from European Application No. 01309199.6–2111–corresponding to this U.S. application.

* cited by examiner

Primary Examiner—Merrick Dixon
(74) Attorney, Agent, or Firm—Emch, Schaffer, Schaub & Porcello, Co., L.P.A.

(57) ABSTRACT he present invention relates to a fibrous base material having a primary layer and a secondary layer of friction modifying particles on at least one surface of the primary layer for use as an anti-shudder friction material. The fibrous base material is impregnated with a phenolic or phenolic-based resin material to form a friction material.

28 Claims, 16 Drawing Sheets

- ◆ Good Curve Shape
- ↑ High Material Porosity
- ↑ High Friction Material Modifier Content (Surface and/or Whole Structure)

- ◆ Long Term Friction Stability
- ↑ High Porosity (anti-glazing)
- ↑ High Temperature Ingredients Cycle 50

Cycle 2000

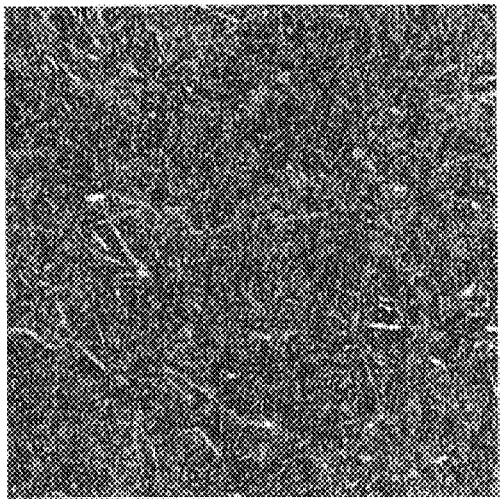
Figure 6a-New Slip Material
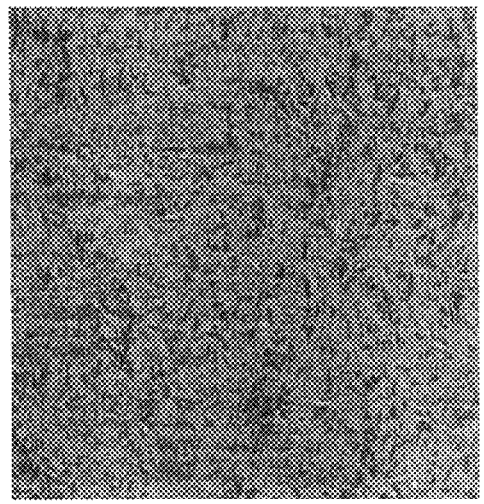
Figure 6b-Conventional Slip Material Shudder

FRICTION MATERIAL FORMED BY DEPOSITION OF FRICTION MODIFIERS ON HIGH, WET ENERGY CARBONACEOUS FRICTION MATERIALS

TECHNICAL FIELD

The present invention relates to a non-asbestos, non-metallic fibrous base material comprising a first layer of fibrillated aramid fibers, (and optionally cotton fibers, carbon fibers, carbon particles and a filler material, such as diatomaceous earth) and a second layer of friction modifying particles. The invention further relates to a composite friction material comprising the above described fibrous base material impregnated with a phenolic resin or a phenolic based resin blend.

The friction material of the present invention has improved anti-shudder characteristics and improved strength, porosity, wear resistance and noise resistance.

BACKGROUND ART

New and advanced transmission systems and braking systems are being developed by the automotive industry. These new systems often involve high energy requirements. Therefore, the friction materials technology must be also developed to meet the increasing energy requirements of these advanced systems.

In particular, a new high energy type friction material is needed. The new high energy friction material must be able to withstand high speeds wherein surface speeds are up to about 65 m/seconds. Also, the friction material must be able to withstand high facing lining pressures up to about 1500 psi. It is also important that the friction material be useful under limited lubrication conditions.

The friction material must be durable and have high heat resistance in order to be useful in the advanced transmission and braking systems. Not only must the friction material remain stable at high temperatures, it must also be able to rapidly dissipate the high heat that is being generated during operating conditions.

The high speeds generated during engagement and disengagement of the new transmission and braking systems mean that a friction material must be able to maintain a relatively constant friction throughout the engagement. It is important that the frictional engagement be relatively constant over a wide range of speeds and temperatures in order to minimize "shuddering" of materials during braking or the transmission system during power shift from one gear to another. It is also important that the friction material have a desired torque curve shape so that during frictional engagement the friction material is noise or "squawk" free.

In particular, transmission and torque-on-demand systems incorporate slipping clutches mainly for the fuel efficiency and driving comfort. The role of the slip clutch within these systems varies from vehicle launching devices, such as wet start clutches, to that of a torque converter clutches. According to the operating conditions, the slip clutch can be differentiated into three principle classes: (1) Low Pressure and High Slip Speed Clutch, such as wet start clutch; (2) High Pressure and Low Slip Speed Clutch, such as Converter Clutch; and (3) Extreme Low Pressure and Low Slip Sped Clutch, such as neutral to idle clutch.

The principal performance concerns for all applications of the slip clutch are the prevention of shudder and the energy management of the friction interface. The occurrence of shudder can be attributed to many factors including the friction characteristics of the friction material, the mating surface's hardness and roughness, oil film retention, lubricant chemistry and interactions, clutch operating conditions, driveline assembly and hardware alignment, and driveline contamination. The friction interface energy management is primarily concerned with controlling interface temperature and is affected by the pump capacity, oil flow path and control strategy. The friction material surface design also contributes to the efficiency of interface energy management.

Previously, asbestos fibers were included in the friction material for temperature stability. Due to health and environmental problems, asbestos is no longer being used. More recent friction materials have attempted to overcome the absence of the asbestos in the friction material by modifying impregnating paper or fiber materials with phenolic or phenolic-modified resins. These friction materials, however, do not rapidly dissipate the high heat generated, and do not have the necessary heat resistance and satisfactory high coefficient of friction performance now needed for use in the high speed systems currently being developed.

The present invention is an improvement over the Seitz U.S. Pat. No. 5,083,650 reference which involves a multi-step impregnating and curing process; i.e., a paper impregnated with a coating composition, carbon particles are placed on the paper, the coating composition in the paper is partially cured, a second coating composition is applied to the partially cured paper, and finally, both coating compositions are cured.

In other friction materials, metallic fibers combined with carbon materials were included in the friction material for wear resistance. For example, Fujimaki et al. U.S. Pat. No. 4,451,590 describes a friction material having metallic fibers, filler, carbon particles, carbon fibers and phenolic resin. However, the metallic based friction materials do not have sufficient porosity and compressibility to be capable of high fluid permeation capacity during use. Also, the metallic based friction materials are not sufficiently resilient or elastic, yet resistant to compression set to be capable of withstanding high facing lining pressures of up to about 1500 psi (approximately 105 kg/cm$^2$). The metallic based friction material also is not capable of withstanding high surface speeds of up to about 65 m/second which are generated during engagement and disengagement of the new transmission and braking systems.

The present invention is also an improvement over earlier co-owned patents by the assignee herein, BorgWarner Inc., for friction materials. In particular, U.S. Pat. No. 5,998,307 relates to a friction material having a base impregnated with a curable resin where a porous primarily layer comprises at least one fibrous material and a secondary layer comprises carbon particles covering at least about 3 to about 90% of the surface of the primary layer. The U.S. Pat. No. 5,858,883 relates to a base material having a primary layer of less fibrillated aramid fibers, synthetic graphite, and a filler, and a secondary layer comprising carbon particles on the surface of the primary layer. U.S. Pat. No. 5,856,224 relates to a friction material comprising a base impregnated with a curable resin. The primary layer comprises less fibrillated aramid fibers, synthetic graphite and filler; the secondary layer comprises carbon particles and a retention aid. The U.S. Pat. No. 5,958,507 relates to a process for producing the friction material where at least one surface of the fibrous material which comprises less fibrillated aramid fibers is coated with carbon particles and a retention aid when at least 3 to 90% of the surface, impregnating with a phenolic or modified phenolic resin and curing. The U.S. Pat. No. 6,001,750 relates to a friction material comprising a fibrous base material impregnated with a curable resin. The porous primarily layer comprises less fibrillated aramid fibers, carbon particles, carbon fibers, filler material, phenolic novoloid fibers, and optionally, cotton fibers. The secondary layer comprises carbon particles which cover the surface at about 3 to about 90% of the surface.

It is to be understood that the various primary layers described in the above-referenced BorgWarner patents are useful with the present invention and are fully incorporated herein by reference.

In addition, various base materials, as described in commonly owned BorgWarner Inc. U.S. Pat. Nos. 5,753,356 and 5,707,905 (which describe base materials comprising less fibrillated aramid fibers, synthetic graphite and filler) are also contemplated as being useful with the present invention and as such are fully incorporated herein by reference. Yet another commonly owned patent, U.S. Pat. No. 6,130,176, relates to non-metallic fibrous base materials comprising less fibrillated aramid fibers, carbon fibers, carbon particles and filler and is also considered to be useful as a primary layer in the present invention and is fully incorporated herein by reference.

In order for friction materials to be useful in "wet" applications, the friction material must have a wide variety of acceptable characteristics. The friction material must be resilient or elastic yet resistant to compression set, abrasion and stress; have high heat resistance and be able to dissipate heat quickly; and, have long lasting, stable and consistent frictional performance. If any of these characteristics are not met, optimum performance of the friction material is not achieved.

It is also important that a suitable impregnating resin be used with the fibrous base material in order to form a high energy application friction material. The friction material must have good shear strength both when saturated with the wet resin during impregnation and when saturated with brake fluid or transmission oil during use.

It is also important, under certain applications, that the friction material have high porosity such that there is a high fluid permeation capacity during use. Thus, it is important that the friction material not only be porous, it must also be compressible. The fluids permeated into the friction material must be capable of being squeezed or released from the friction material quickly under the pressures applied during operation of the brake or transmission, yet the friction material must not collapse. It is also important that the friction material have high thermal conductivity to also help rapidly dissipate the heat generated during operation of the brake or transmission.

As far as is known, there is no disclosure of an anti-shudder friction material for use in transmission systems which includes a fibrous base material comprising an aramid-type fiber first layer and a secondary layer of friction modifying particles, including, in particular, silica materials, carbonized carbon particles and/or resin powders.

Accordingly, it is an object of the present invention to provide an improved friction material with reliable and improved properties compared to those of the prior art.

A further object of this invention is to provide friction materials with improved anti-shudder characteristics and high thermal conductivity, porosity strength, and noise resistance.

As a result of extensive research in view of the need for a better friction material, a friction material with improved characteristics has been developed by the invention. The present wet friction material is useful in "wet" applications where the friction material is "wetted" or impregnated with a liquid such as brake fluid or automatic transmission fluid during use. During use of the "wet" friction material, the fluid is ultimately squeezed from or is impregnating the friction material. Wet friction materials differ greatly, both in their compositions and physical characteristics from "dry" friction materials.

DISCLOSURE OF THE INVENTION

In order to achieve the requirements discussed above, many materials were evaluated for friction and heat resistant characteristics under conditions similar to those encountered during operation. Both commercially available brake linings and transmission materials were investigated and proved not to be suitable for use in high energy applications.

The present invention is especially useful in brakes and in clutch applications. The present invention provides a fibrous base material with an optimum amount of friction modifying particles deposited on the surface of the fibrous base material. Preferably, the friction modifying particles are deposited on the fibrous base material during the process for making the fibrous base material.

The present invention is especially useful with a primary layer comprising a fibrous base material comprising aramid fibers alone and/or combinations of less fibrillated aramid fibers, cotton fibers, carbon fibers, carbon particles and at least one filler material and, optionally, other ingredients. In certain examples, the less fibrillated aramid fibers create a porous fibrous base material. The carbon fibers provide the friction material with good heat conduction such that the friction material has desired heat resistance. The carbon particles also provide the friction material with good friction characteristics such as a good or smooth "feel" in shift and essentially noise or "squawk" free operation of the brakes and clutches. The presence of a small relative amount of cotton fibers provides the friction material with desired "break-in" characteristics such that there is little or no shudder occurring during the initial use of the friction material.

A secondary, or top, layer of friction modifying particles is deposited on the primary layer to form the fibrous base material. Various friction modifying particles are useful as the secondary layer on the fibrous base material. In particular, silica particles such as diatomaceous earth, celite, celatom, and/or silicon dioxide are especially useful. The surface friction modifying particles are present at about 0.2 to about 20%, by weight, and preferably about 2–10%, by weight, and most preferably about 3–5%, by weight, of the fibrous base material.

The fibrous base material can be impregnated using different resin systems. In certain embodiments, it is useful to impregnate the fibrous based material with a phenolic resin or a modified phenolic-based resin. In certain embodiments, when a silicone resin is blended or mixed with a phenolic resin in compatible solvents and that silicone-phenolic resin blend is used to impregnate a fibrous base material of the present invention, an especially useful high energy friction material is formed.

BRIEF DESCRIPTION OF DRAWINGS

FIGS. 6a and 6b show the surface appearance after the P25 test for: FIG. 6a-the friction material of the present invention, BW; and FIG. 6b-the conventional slip friction material, M1.

FIG. 8-the friction material of the present invention, BW; and FIG. 9, a woven carbon fabric material.

FIG. 12a and FIG. 13a are graphs showing slip speed (rpm) and $\mu$-v slope and slip torque vehicle test results for: FIG. 12a- the conventional friction material, M1; and the friction material of the present invention, BW.

FIG. 12b and FIG. 13b are graphs showing: apply pressure, engine speed, clutch speed, slip torque (and for FIG. 12b-shudder) for $\mu$-v slope and slip torque vehicle test results for: FIG. 12b- the conventional friction material, M1; and FIG. 13b- the friction material of the present invention, BW.

BEST MODE OF CARRYING OUT THE INVENTION

Figure 1:
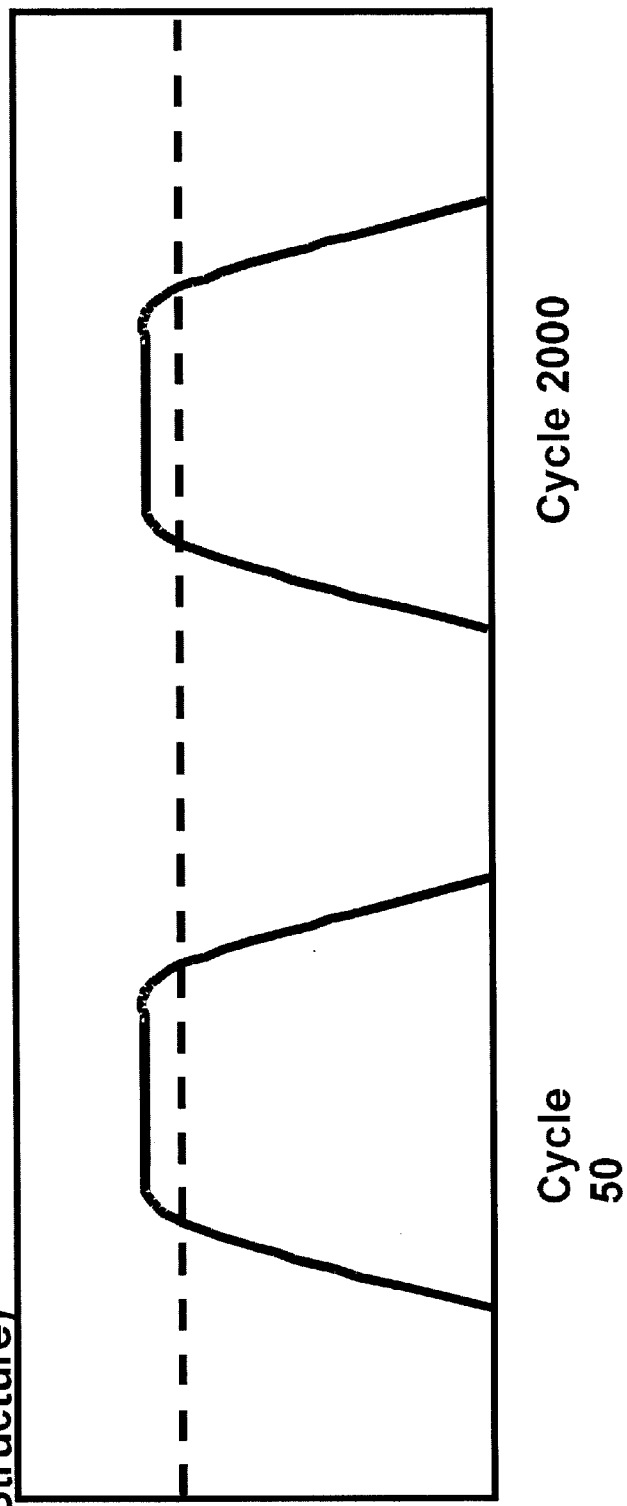
FIG. 1 is a graph of slip clutch material performance showing a good curve shape for a material at cycle 50 and at cycle 2000.

The friction material of the present invention has improved anti-shudder characteristics. Also, the friction material has improved elasticity and porosity which allows for more uniform heat dissipation during use of the friction material. The fluid in the transmission or brake can rapidly move through the porous structure of the friction material. Further, the increased elasticity provides more uniform pressure or even pressure distribution on the friction material such that uneven lining wear or separator plate "hot spots" are eliminated.

The more porous the structure of the friction material, the more efficient is the heat dissipation. The oil flow in and out of the friction material during engagement of the friction material during use occurs more rapidly when the friction material is porous.

Various methods for impregnating the friction materials of the present invention can be used. The fibrous base material is impregnated with the phenolic or phenolic based resin, preferably so that the impregnating resin material comprises about 45 to about 65 parts, by weight, per 100 parts, by weight, of the friction material. After the fibrous base material has been impregnated with the resin, the impregnated fibrous base material is heated to a desired temperature for a predetermined length of time to form the friction material. The heating cures the phenolic resin at a temperature of about 300° F. When other resins are present, such as a silicone resin, the heating cures the silicone resin at a temperature of about 400° F. Thereafter, the impregnated and cured friction material is adhered to the desired substrate by suitable means.

Various resins useful in impregnating the fibrous base material include phenolic resins and phenolic-based resins. It is to be understood that various phenolic-based resins which include in the resin blend other modifying ingredients, such as epoxy, butadiene, silicone, tung oil, benzene, cashew nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the impregnant resin blend contains about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Examples of useful phenolic and phenolic-silicone resins useful in the present invention are disclosed in the above-referenced BorgWarner U.S. patents which are fully incorporated herein, by reference. Silicone resins useful in the present invention include, for example, thermal curing silicone sealants and silicone rubbers. Various silicone resins are useful with the present invention. One resin, in particular, comprises xylene and acetylacetone (2,4-pentanedione). The silicone resin has a boiling point of about 362° F. (183° C.), vapor pressure at 68° F. mm, Hg: 21, vapor density (air=1) of 4.8, negligible solubility in water, specific gravity of about 1.09, percent volatile, by weight, 5% evaporation rate (ether=1), less than 0.1, flash point about 149° F. (65° C.) using the Pensky-Martens method. It is to be understood that other silicone resins can be utilized with the present invention. Other useful resin blends include, for example, a suitable phenolic resin comprises (% by wt.): about 55 to about 60% phenolic resin; about 20 to about 25% ethyl alcohol; about 10 to about 14% phenol; about 3 to about 4% methyl alcohol; about 0.3 to about 0.8% formaldehyde; and, about 10 to about 20% water. Another suitable phenolic-based resin comprises (% by wt.): about 50 to about 55% phenol/formaldehyde resin; about 0.5% formaldehyde; about 11% phenol; about 30 to about 35% isopropanol; and, about 1 to about 5% water.

It has also been found that another useful resin is an epoxy modified phenolic resin which contains about 5 to about 25 percent, by weight, and preferably about 10 to about 15 percent, by weight, of an epoxy compound with the remainder (excluding solvents and other processing aids) phenolic resin. The epoxy-phenolic resin compound provides, in certain embodiments, higher heat resistance to the friction material than the phenolic resin alone.

In certain embodiments, it is preferred that the target pick up of resin by the fibrous base material range from about 40 to about 65%, and, in certain embodiments, about 60 to at least 65%, by weight, total silicone-phenolic resin. After the fibrous base material is impregnated with the resin, the fibrous base material is cured for a period of time (in certain embodiments for about ½ hour) at temperatures ranging between 300–400° C. to cure the resin binder and form the friction material. The final thickness of the friction material depends on the initial thickness of the fibrous base material and, in certain embodiments, preferably ranges from about 0.014" to about 0.040".

It further contemplated that other ingredients and processing aids known to be useful in both preparing resin blends and in preparing impregnating fibrous-based materials can be included in the friction materials.

Both the silicone resin and the phenolic resin are present in solvents which are compatible to each other. These resins are mixed together (in preferred embodiments) to form a homogeneous blend and then used to impregnate a fibrous base material. There is not the same effect if a fibrous base material is impregnated with a phenolic resin and then a silicone resin is added thereafter or vice versa. There is also a difference between a mixture of a silicone-phenolic resin solution, and emulsions of silicone resin powder and/or phenolic resin powder. When silicone resins and phenolic resins are in solution they are not cured at all. In contrast, the powder particles of silicone resins and phenolic resins are partially cured. The partial cure of the silicone resins and the phenolic resins inhibits a good impregnation of the fibrous base material.

In certain embodiments of the present invention, the fibrous base material is impregnated with a blend of a silicone resin in a solvent which is compatible with the phenolic resin and its solvent. In one embodiment, isopropanol has been found to be an especially suitable solvent. It is to be understood, however, that various other suitable solvents, such as ethanol, methyl-ethyl ketone, butanol, isopropanol, toluene and the like, can be utilized in the practice of this invention. The presence of a silicone resin, when blended with a phenolic resin and used to impregnate a fibrous base material, causes the resulting friction materials to be more elastic than fibrous base materials impregnated only with a phenolic resin. When pressures are applied to the silicone-phenolic resin blended impregnated friction material of the present invention, there is a more even distribution of pressure which, in turn, reduces the likelihood of uneven lining wear. After the silicone resin and phenolic resin are mixed together, the mixture is used to impregnate a fibrous base material.

In certain embodiments, less fibrillated fibers and carbon fibers are used in the fibrous base material to provide a desirable pore structure to the friction material which, in turn, provides increased thermal resistance to the friction material. The fiber geometry not only provides increased thermal resistance, but also provides delamination resistance and squeal or noise resistance. The presence of the carbon fibers and carbon particles aids in increasing the thermal resistance, maintaining a steady coefficient of friction and increasing the squeal resistance. A relatively low amount of cotton fibers in the fibrous base material improves the friction material's clutch "break-in" characteristics.

The use of less fibrillated aramid fibers and carbon fibers in a fibrous base material improves the friction material's ability to withstand high temperatures. Less fibrillated aramid fibers generally have few fibrils attached to a core fiber. The use of the less fibrillated aramid fibers provides a friction material having a more porous structure; i.e., there are more and larger pores than if a typical fibrillated aramid fiber is used. The porous structure is generally defined by the pore size and liquid permeability. In a preferred embodiment, the fibrous base material defines pores ranging in mean average size from about 2.0 to about 25 microns in diameter. In certain embodiments, the mean pore size ranges from about 2.5 to about 8 microns in diameter and the friction material had readily available air voids of at least about 50% and, in certain embodiments, at least about 60% or higher.

When the friction material has a higher mean flow pore diameter and permeability, the friction material is more likely to run cooler or with less heat generated in a transmission due to better automatic transmission fluid flow throughout the porous structure of the friction material. During operation of a transmission system, oil deposits on the surface of the friction material tend to develop over time due to a breakdown of the automatic transmission fluid, especially at high temperatures. The oil deposits on the fibers decrease the pore openings. Therefore, when the friction material initially starts with larger pores, there are more open pores remaining during the useful life of the friction material. In addition, in embodiments at least partially impregnated with a silicone resin, the silicone resin, due its elastic characteristics, allows the fibers in the friction material to have an even more open structure.

It is desired that the aramid fibers have a length ranging from about 0.5 to about 10 mm and a Canadian Standard Freeness (CSF) of greater than about 300. In certain embodiments, it is desired to use less fibrillated aramid fibers which have a CSF of about 450 to about 550 preferably about 530 and greater; and, in other certain embodiments, about 580–650 and above and preferably about 650 and above. In contrast, more fibrillated fibers, such as aramid pulp, have a freeness of about 285–290.

The "Canadian Standard Freeness" (T227 om-85) means that the degree of fibrillation of fibers can be described as the measurement of freeness of the fibers. The CSF test is an empirical procedure which gives an arbitrary measure of the rate at which a suspension of three grams of fibers in one liter of water may be drained. Therefore, the less fibrillated aramid fibers have higher freeness or higher rate of drainage of fluid from the friction material than other aramid fibers or pulp. Friction materials comprising the aramid fibers having a CSF ranging from about 430–650 (and in certain embodiments preferably about 580–640, or preferably about 620–640), provide superior friction performance and have better material properties than friction materials containing conventionally more fibrillated aramid fibers. The longer fiber length, together with the high Canadian freeness, provide a friction material with high strength, high porosity and good wear resistance. The less fibrillated aramid fibers (CSF about 530-about 650) have especially good long-term durability and stable coefficients of friction.

Various fillers are also useful in the primary layer of the fibrous base material of the present invention. In particular, silica fillers, such as diatomaceous earth, are useful. However, it is contemplated that other types of fillers are suitable for use in the present invention and that the choice filler depends on the particular requirements of the friction material.

In certain embodiments, cotton fiber is added to the fibrous base material of the present invention to give the fibrous material higher coefficients of friction. In certain embodiments, about 5 to about 20%, and, in certain embodiments, about 10% cotton can also be added to the fibrous base material.

One example of a formulation for the primary layer of a fibrous base material as described in the above incorporated by reference U.S. Pat. No. 6,130,176, which comprises about 10 to about 50%, by weight, of a less fibrillated aramid fiber; about 10 to about 35%, by weight, of activated carbon particles; about 5 to about 20%, by weight, cotton fibers, about 2 to about 15%, by weight, carbon fibers; and, about 10 to about 35%, by weight, of a filler material. In certain embodiments, one particular formulation has found to be useful comprises about 35 to about 45%, by weight, less fibrillated aramid fibers: about 10 to about 20%, by weight, activated carbon particles; about 5 to about 15% cotton fibers; about 2 to about 10%, by weight, carbon fibers; and, about 25 to about 35%, by weight, filler.

The use of friction modifying particles on the primary layer of the fibrous base material provides a three dimensional structure to the fibrous base material.

The uniformity of the secondary layer of the friction modifying particles on the surface of fibrous base materials is achieved by using a range and size of the particles that is preferably from about 0.5 to about 80 microns, and preferably about 0.5 to about 20 microns. In these certain embodiments, it has been discovered that if the friction modifying particle size is too large or too small, the optimum three-dimensional structure not achieved and, consequently, the heat dissipation is not as optimum.

In preferred embodiments, the amount of friction modifying particles on the primary layer ranges from about 0.2 to about 20%, by weight, and in certain embodiments about 2 to about to about 15%, by weight, and in certain preferred embodiments about 2 to about 5%, by weight, of the friction paper. In preferred embodiments, the area of coverage of friction modifying particles on the primary layer surface is in the range of the about 3 to about 90% of the surface area.

The secondary layer of the friction modifying particles is deposited on the primary layer to form the fibrous base material. Various friction modifying particles are useful as the secondary layer on the fibrous base material. Useful friction modifying particles include silica particles; resin powders such as phenolic resins, silicone resins epoxy resins and mixtures thereof; partial and/or fully carbonized carbon powders and/or particles and mixtures thereof; and mixtures of such friction modifying particles. In particular, silica particles such as diatomaceous earth, Celite®, Celatom®, and/or silicon dioxide are especially useful. The silica particles are inexpensive organic materials which bond strongly to the fibrous materials. The silica particles provide high coefficients of friction to the friction material. The silica particles also provide the friction material with a smooth friction surface and provides a good "shift feel" and friction characteristics to the friction material such that any "shudder" is minimized.

A preferred process for producing the friction material comprises fibers forming the primary layers of the fibrous base material. At least one surface of the primary layer of the fibrous base material is coated with the friction modifying particles. The fibrous base material with the friction modifying particles coated thereon is then impregnated with at least one phenolic or phenolic-based resin. The impregnated, coated fibrous base material is cured at a predetermined temperature for a predetermined period of time to form the friction material.

Figure 2:
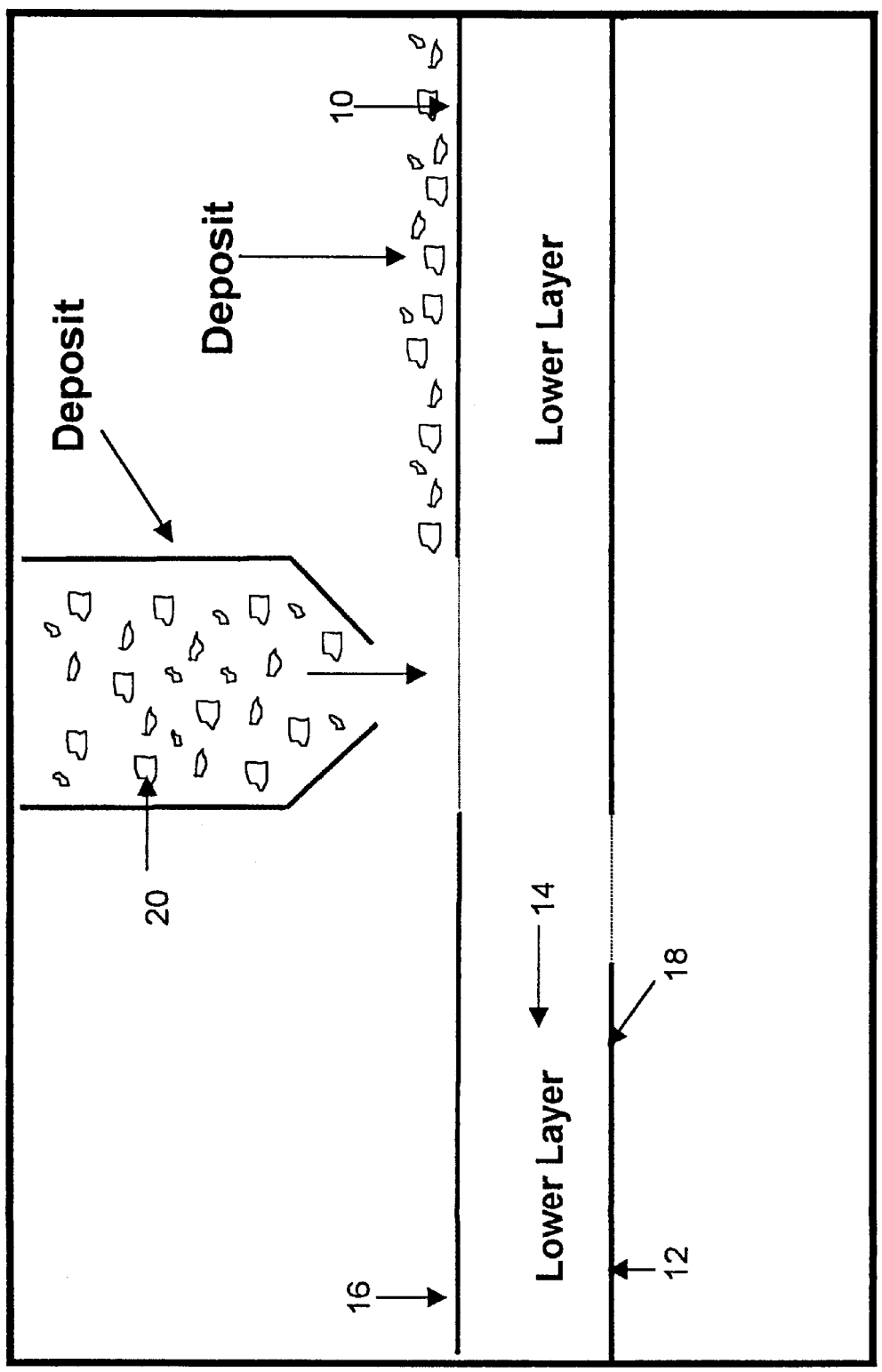
FIG. 2 is a schematic diagram showing one method for making a friction material according to the present invention.

One preferred embodiment for making a friction material 10 of the present invention is shown in FIG. 2. A fibrous base material 12 comprises a lower layer 14 having an upper or top surface 16 and a lower or bottom surface 18. While the lower layer 14 is wet, friction modifying particles 20 are deposited onto the top surface 16 of the wet lower layer 14.

In certain methods it is also useful to use vacuum pressure (not shown) on the lower surface 18 of the wet layer 14 prior to deposition of the friction modifying particles 20 on the top surface 16 of the layer 14.

It has been found that the secondary layer of friction modifying particles on the primary layer of the fibrous base material provides a friction material with good anti-shudder characteristics, high durability, good wear resistance and improved break-in characteristics.

The following examples provide further evidence that the friction modifying particle coated fibrous base material and resulting friction material of the present invention are an improvement over the conventional friction materials. Various preferred embodiments of the invention are described in the following examples, which however, are not intended to limit the scope of the invention.

EXAMPLES

Slip Clutch Interface Technology Requirements: The friction materials of the present invention are designed for slipping clutch applications that meet special requirements. These requirements include high mechanical strength, heat resistance, glazing resistance and shudder resistance. The friction material of the present invention has high porosity, a unique material structure for high mechanical strength, high temperature conductivity, and anti-shudder friction modifier characteristics. These material characteristics are the necessary conditions of smooth slip torque output and long term friction stability.

The slip clutch material requirements for desirable slip torque response and long-term durability include good curve shape and long term friction stability. The good curve shape, as shown in FIG. 1, is dependent on high material porosity and high friction modifier content. The long term friction stability is dependent on high porosity (anti-glazing) and high temperature ingredients.

The fibrous base material structure contains a porous and high temperature synthetic fibers network to provide high heat dissipation and friction stability. Friction modifying particles are deposited on the fibrous base material to provide the "anti-shudder" properties. The friction material of the present invention for slip clutches is shown in FIG. 2. BW is a friction material of the present invention having a primary layer of a fibrous base material comprising about 38–40%, by weight, of less fibrillated aramid fibers; about 13–15%, by weight, carbon particles; about 10–12%, by weight, cotton fibers, about 4–6%, by weight, carbon fibers; and about 28–30%, by weight, celite filler material; and having a secondary, or top layer comprising about 3% to about 5%, by weight, celite friction modifying particles. The M1 is a conventional low-speed slip material comprising about 25%, by weight, aramid fibers; about 25%, by weight, cotton fibers; and about 15%, by weight, filler material.

Friction Characteristic Tests: Slip clutch friction materials performance and durability are evaluated by the following tests:

1. High speed slip durability bench test (P25): extreme high energy, extended slip durability.
2. Low speed slip screening bench test (P31): low speed. continuous slip, $\mu$-v friction characteristics under various operating conditions.
3. Transmission dynamometer durability test.
4. Vehicle performance tests.

The test procedures for slip clutch materials are different from those for shifting clutch materials. The main features for the slip clutch material (such as start clutch) are that it takes a long slip time before the clutch is fully engaged, it requires high friction energy per unit contact area, and the clutch carries high inertia. Table I shows the test conditions for the High Speed Slip Durability Bench Test P25 and the Low Speed Slip Screening Bench Test P31.

TABLE I

Test Condition for P25 and P31 Procedures

| | P25<br>Slip Engagement<br>High Speed<br>Slip Durability | P31<br>Continuous Slip<br>Low Speed<br>Slip Screen |
|---|---|---|
| Oil Temperature (° C.) | 100 | 100 |
| Oil Flow (liter/min) | 3 | 1 |

TABLE I-continued

Test Condition for P25 and P31 Procedures

|  | P25<br>Slip Engagement<br>High Speed<br>Slip Durability | P31<br>Continuous Slip<br>Low Speed<br>Slip Screen |
| --- | --- | --- |
| Cycle | 2000 | 30 |
| Moment of Inertia (kg-m2) | 1.060 | N/A |
| Slip Speed (rpm) | 3300 | 1–500 |
| Facing Pressure (kPa) | 400 | 1500 |
| Energy Density (J/mm2) | 5.826 | N/A |
| Cal. Stop Time (sec) | 9.75 | N/A |
| Power (W) | 6491 | 5.7–2866 |
| Power Density (W/mm2) | 0.597 | 0.001–0.57 |

Figure 2A:
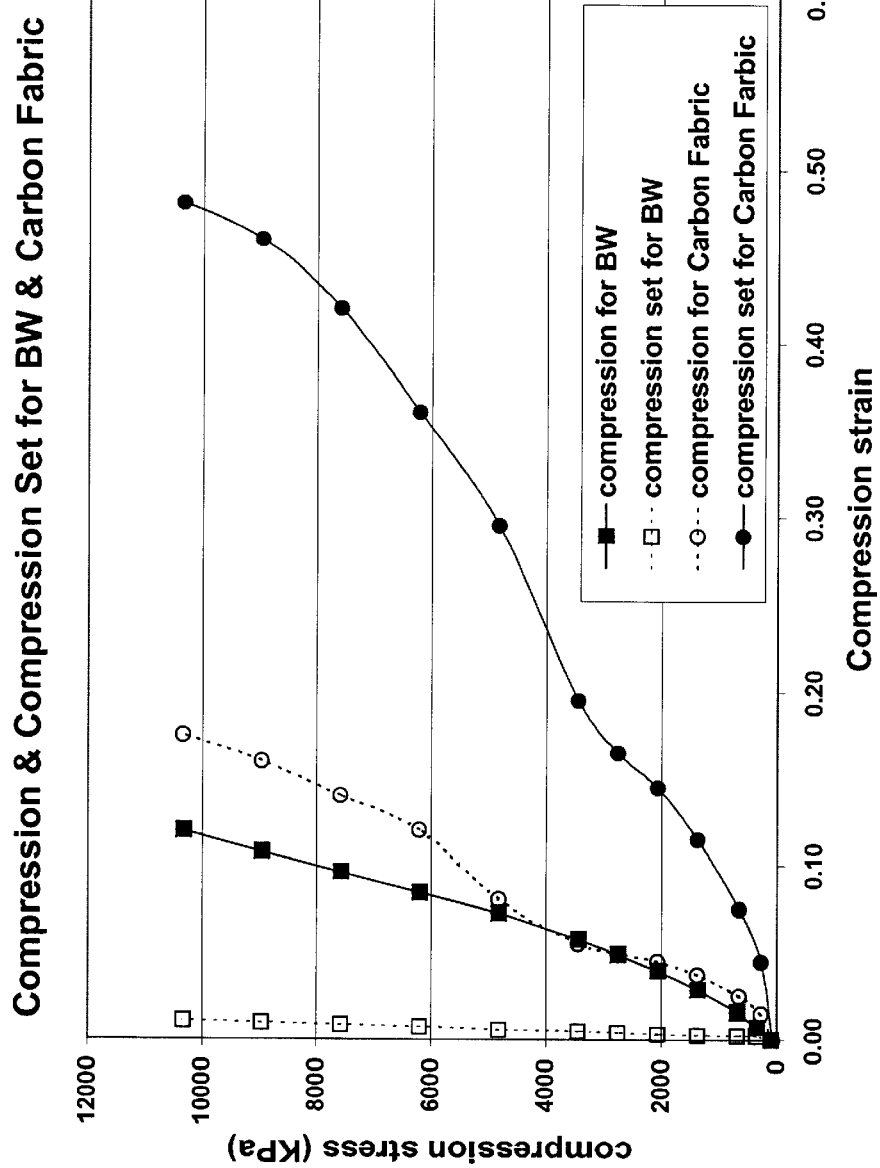
FIG. 2a is a graph showing the compression behavior of BW, the friction material of the present invention, and a woven carbon fabric material.

The materials for the bench tests included BW, M1, and Carbon Fabric. BW material is the friction material of the present invention and comprises a porous, synthetic fiber network to provide high heat dissipation. In addition, friction modifiers were deposited on the surface of the BW material to provide anti-shudder properties. The M1 material is a conventional low speed slip clutch friction material and possesses moderate high-energy capacity, dense structure and lower porosity), a combination of high temperature fibers and lower temperature organic fibers and good "initial" shudder resistance. The Carbon Fabric is a woven material and has the highest porosity of all three materials. However, the carbon fabric material has high surface roughness because of the nature of weaving pattern. In addition, the carbon fabric material is most susceptible to mechanical deformation due to high compression set of the material, as shown in FIG. 2a.

A comparison of material properties for BW and M1 materials is shown in Table II below. The average pore diameter for material M1 is 4 $\mu$ms. In addition to its other features, the friction material BW contains a larger pore structure, where the average pore diameter is about 7 $\mu$ms. Larger pores are less susceptible to blockage through glaze formation because of their increased diameter.

TABLE II

Comparison of Material Physical Properties

|  | BW | M1 |
| --- | --- | --- |
| Porosity (%) | 67.3 | 61.0 |
| median pore size ($\mu$m) | 7.0 | 4.0 |

Figure 3:
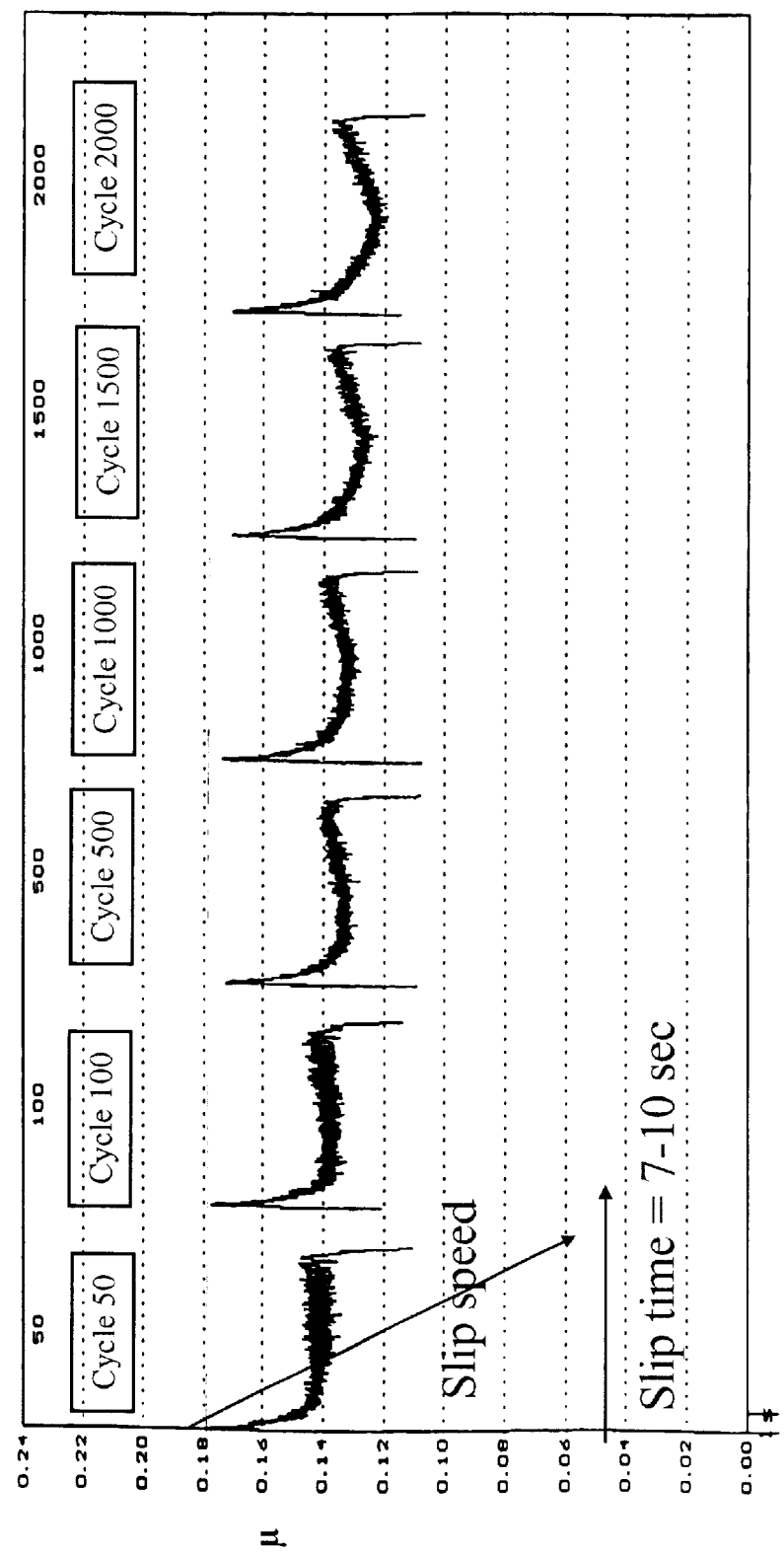
FIG. 3 is a graph showing the high speed slip durability bench test (P25) for the conventional material, M1.
Figure 4:
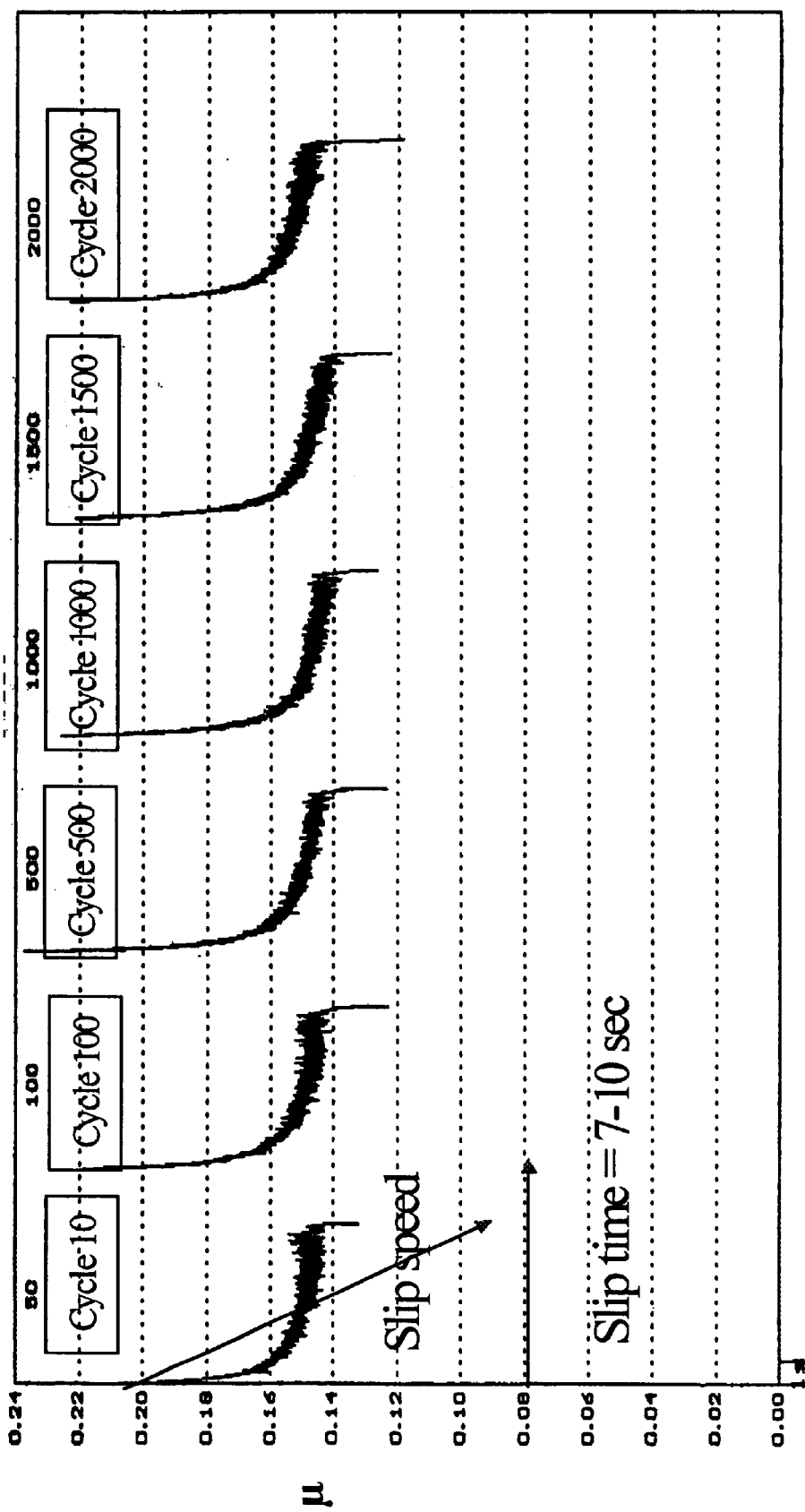
FIG. 4 is a graph showing the high speed slip durability bench test (P25) for the friction material of the present invention, BW.
Figure 5:
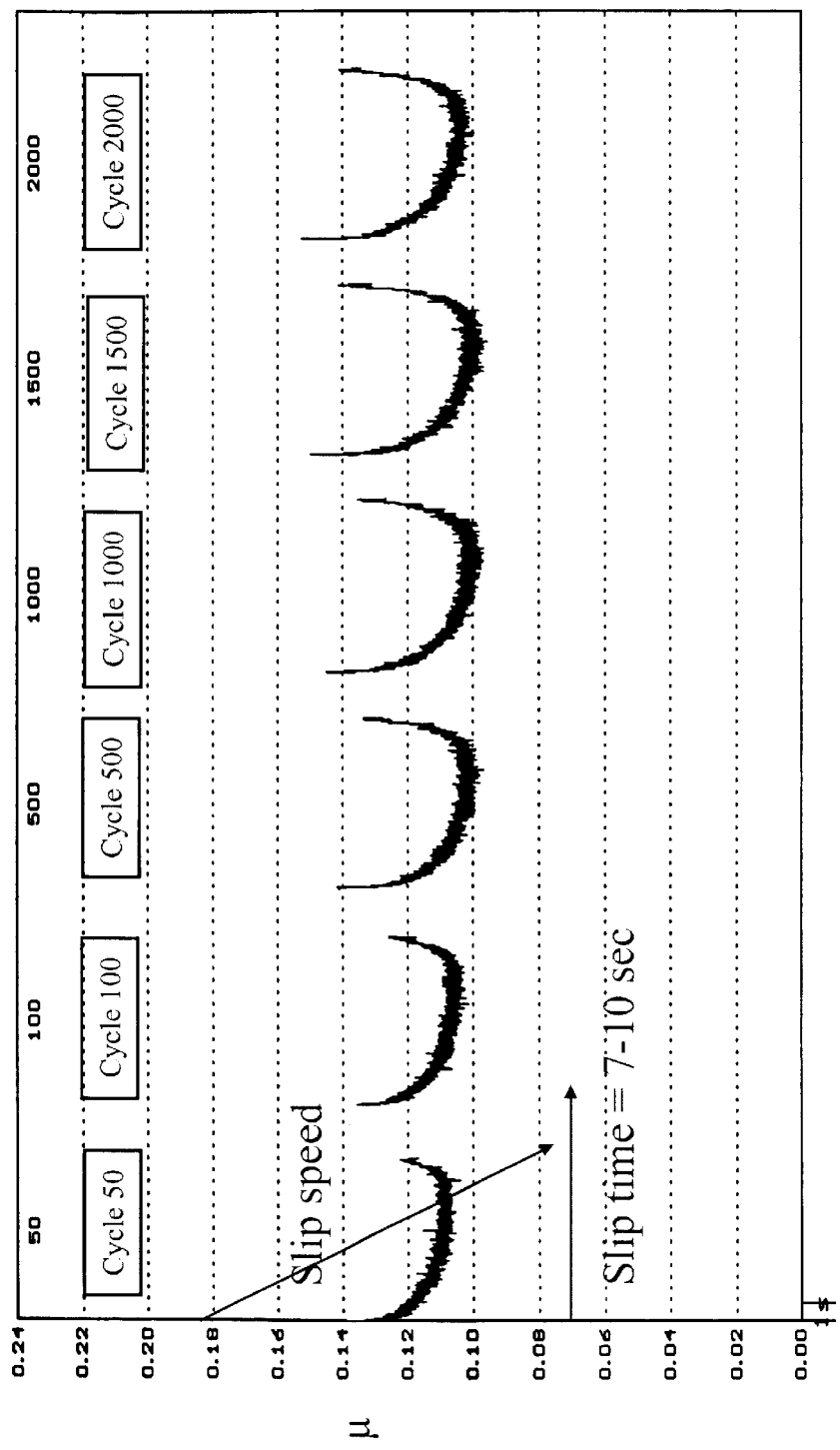
FIG. 5 is a graph showing the high speed slip durability bench test (P25) for a woven carbon fabric material.

FIGS. 3 to 5 show the P25 bench test results for high-speed slip. Material M1 initially exhibited good torque traces (or friction coefficient $\mu$curves), then after 500 cycles started to develop the rooster tailed torque curves clearly evident after 2000 cycles, as shown in FIG. 3. A rooster tailed torque trace is not desirable since it creates a negative $\mu$-v curve that is associated with shudder. FIG. 4 reveals the results of the same test against the friction material of the present invention. The output torque traces are slightly descending or flat. The $\mu$ levels are stable through the whole 2000 cycles. These characteristics, stable $\mu$ and descending/flat torque traces, of the friction material BW are strong evidence of good performance. The test results of Carbon Fabric material are shown in FIG. 5. FIG. 5 shows clearly low $\mu$ values and huge rooster tails on every torque trace (or $\mu$ curve). This is the most undesirable case among these three tests. Similar observations and characteristics trends were observed for these three different materials using different types of automatic transmission fluids.

The friction plates of the BW material and the M1 material, after P25 tests, were examined with the use of an SEM. It was found that material M1 suffered from the surface glazing while the friction material BW had clean surface and remained porous, as shown in FIG. 6. As a low porosity material, M1 became glazed after the durability test. The high porosity of the BW friction material helps to prevent the glazing. The carbon fabric material had good energy capacity; however, the high compressibility (mechanical deformation) the surface roughness and nature of the carbon chemistry made the carbon fabric material very unstable in high energy slip durability tests, as shown in FIG. 5.

Figure 7:
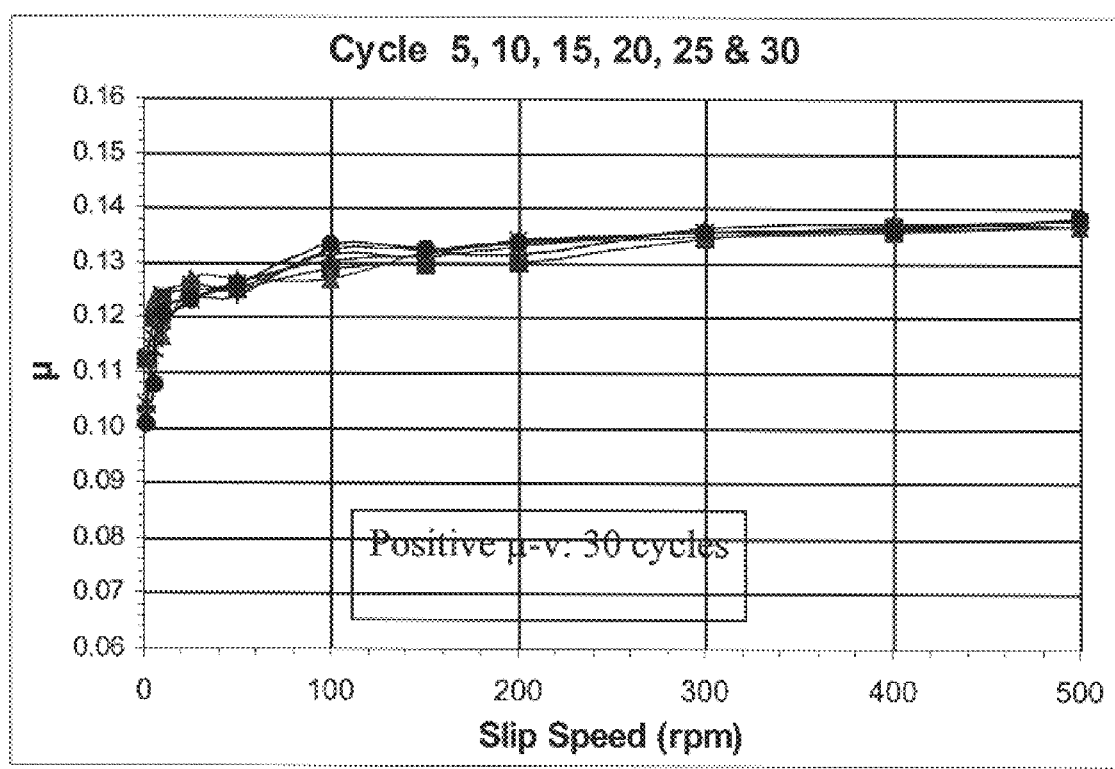
FIGS. 7–9 are graphs showing the low speed slip screening bench test (P31) for FIG. 7-the conventional friction material, M1.
Figure 8:
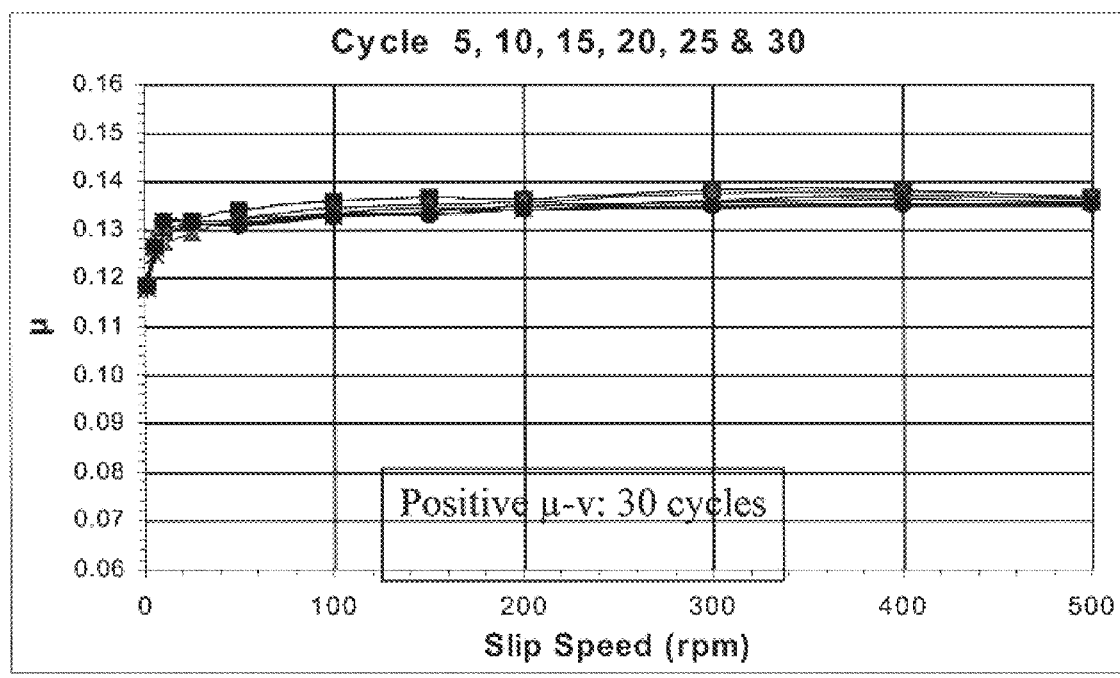
Figure 9:
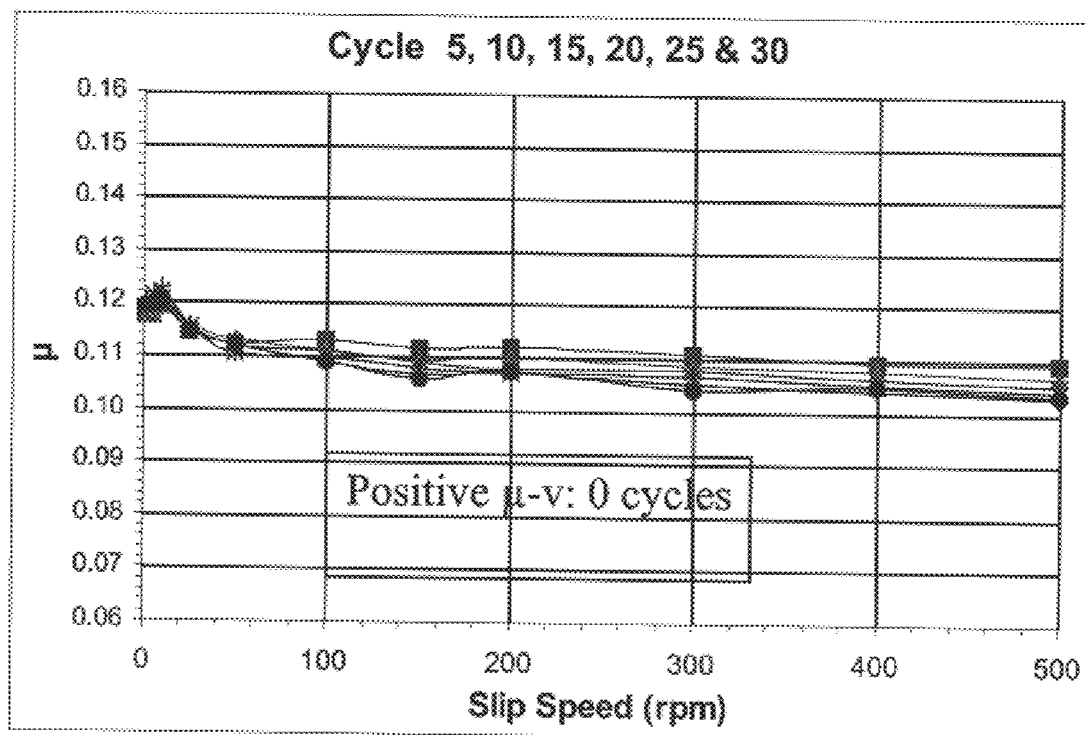

The $\mu$-v relationship at low slip speed for materials BW, M1 and Carbon Fabric are shown in FIGS. 7 to 9. The BW and M1 materials have the positive $\mu$-v slopes, while the Carbon Fabric material exhibits negative $\mu$-v slopes. The positive $\mu$-v slopes are necessary for good shudder resistance. The negative $\mu$-v slopes of the Carbon Fabric material means that the carbon fabric material will most likely produce a shudder in a vehicle. The anti-shudder ingredients in the BW and M1 materials help to create the positive $\mu$-v slopes. The carbon itself can not provide that kind of positive $\mu$-v slope.

A dynamometer test was conducted using a complete transmission to evaluate the durability of the transmission. The test rig was equipped with 2 engines and/or flywheel to simulate the vehicle inertia. The oil temperature was between 85–100° C. The maximum slip speed was about 2500 rpm. The clutch pressure was about 500 KPa. The slip time is about 5 seconds. The complete test was composed of 18 different types of start, each type has different conditions (slip speed, slip time, pressure etc).

Figure 10:
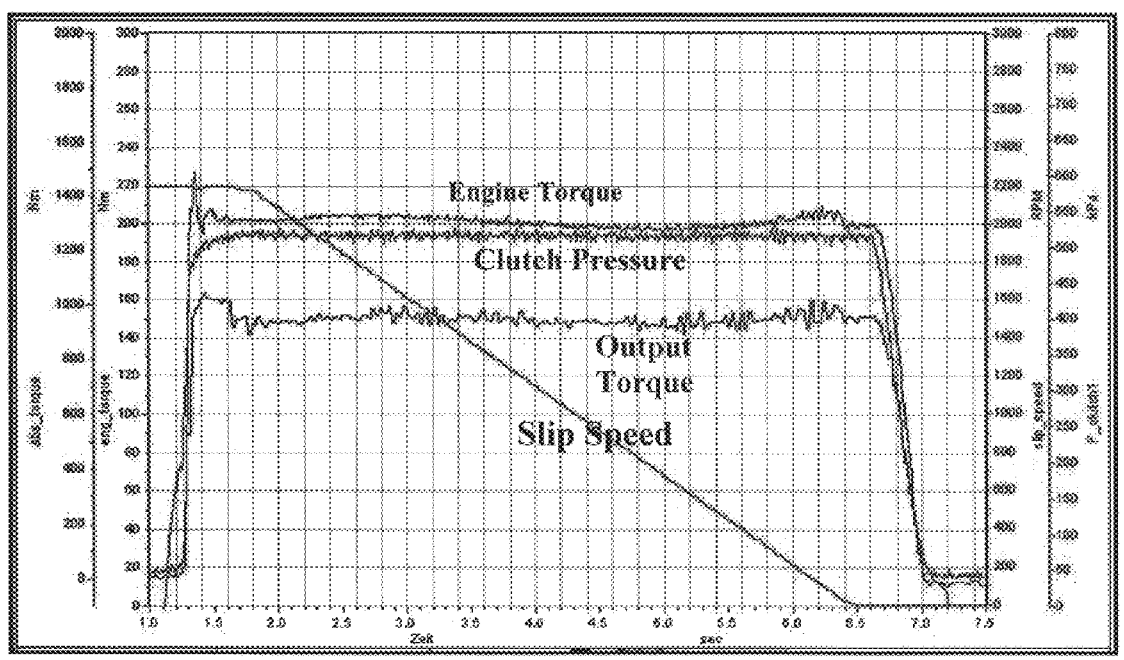
FIGS. 10 and 11 are graphs showing a dynamometer test (the engine torque, clutch pressure, output torque and slip speed) for the friction material of the present invention, BW at 45,000 cycles (FIG. 10) and at 77,000 cycles (FIG. 11).
Figure 11:
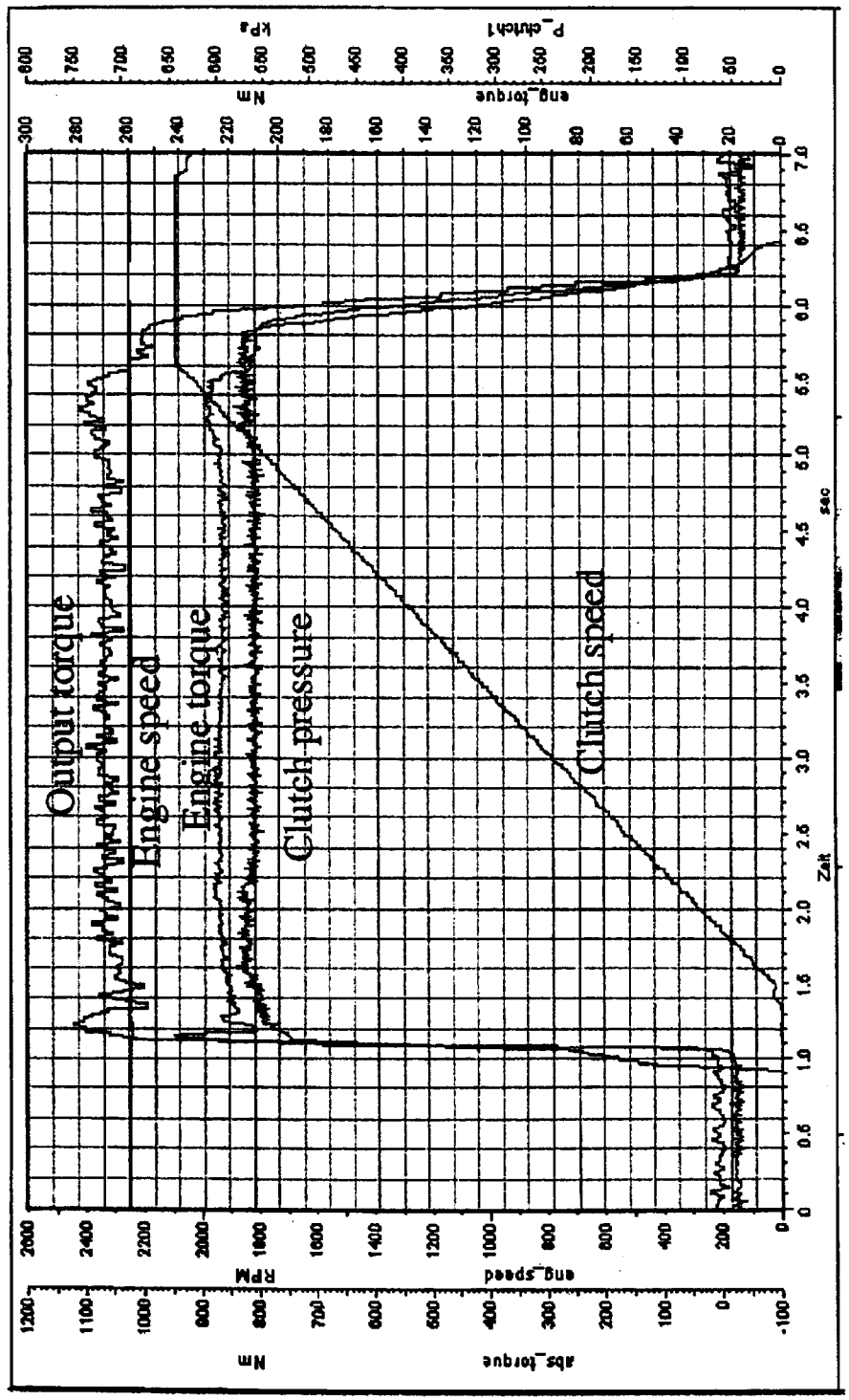

FIGS. 10 and 11 show the results of the dynamometer test that simulates the vehicle operation. The friction material BW has steady $\mu$ values and no shudder at the mid-test (44000 cycles) and the end of test (77,000 cycles of start). The output slip torque is linearly proportional to the input torque. No uncontrollable torque vibration was observed. These results demonstrate the good quality of the friction material BW for high-speed slip clutch applications.

Figure 12A:
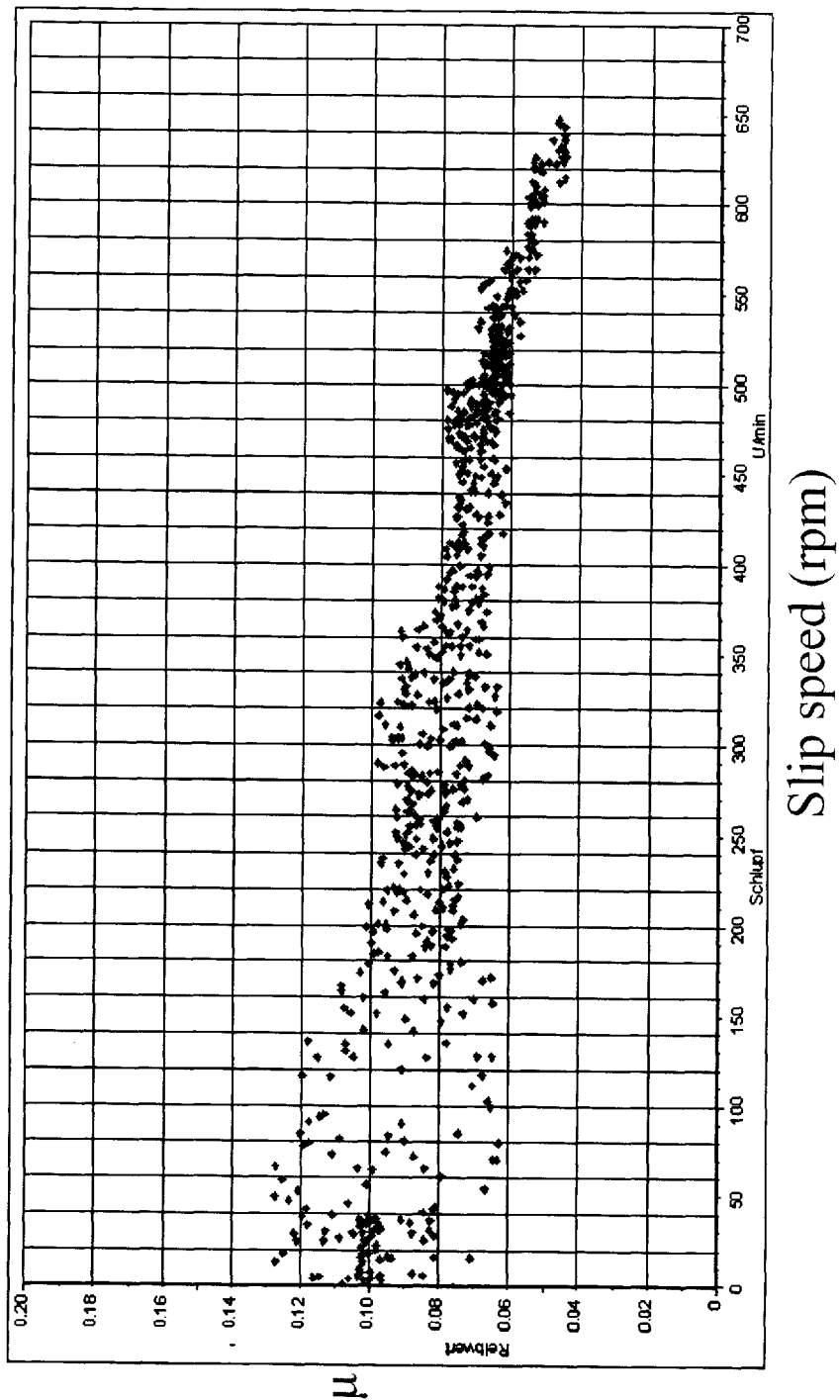
Figure 12B:
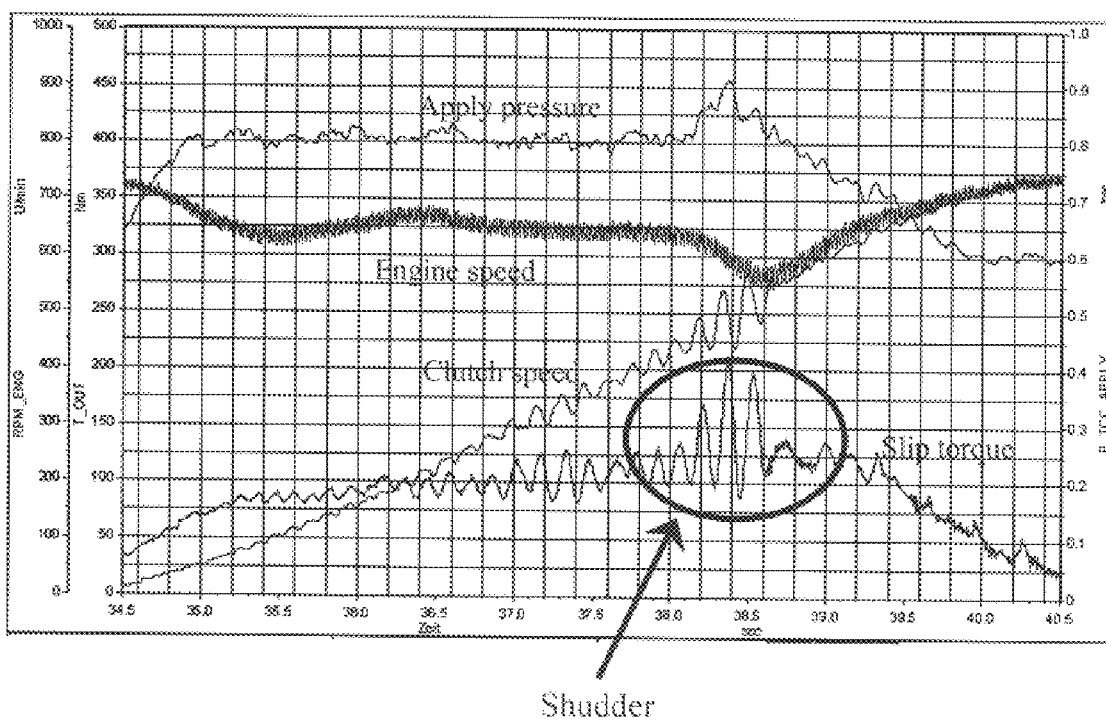
Figure 13A:
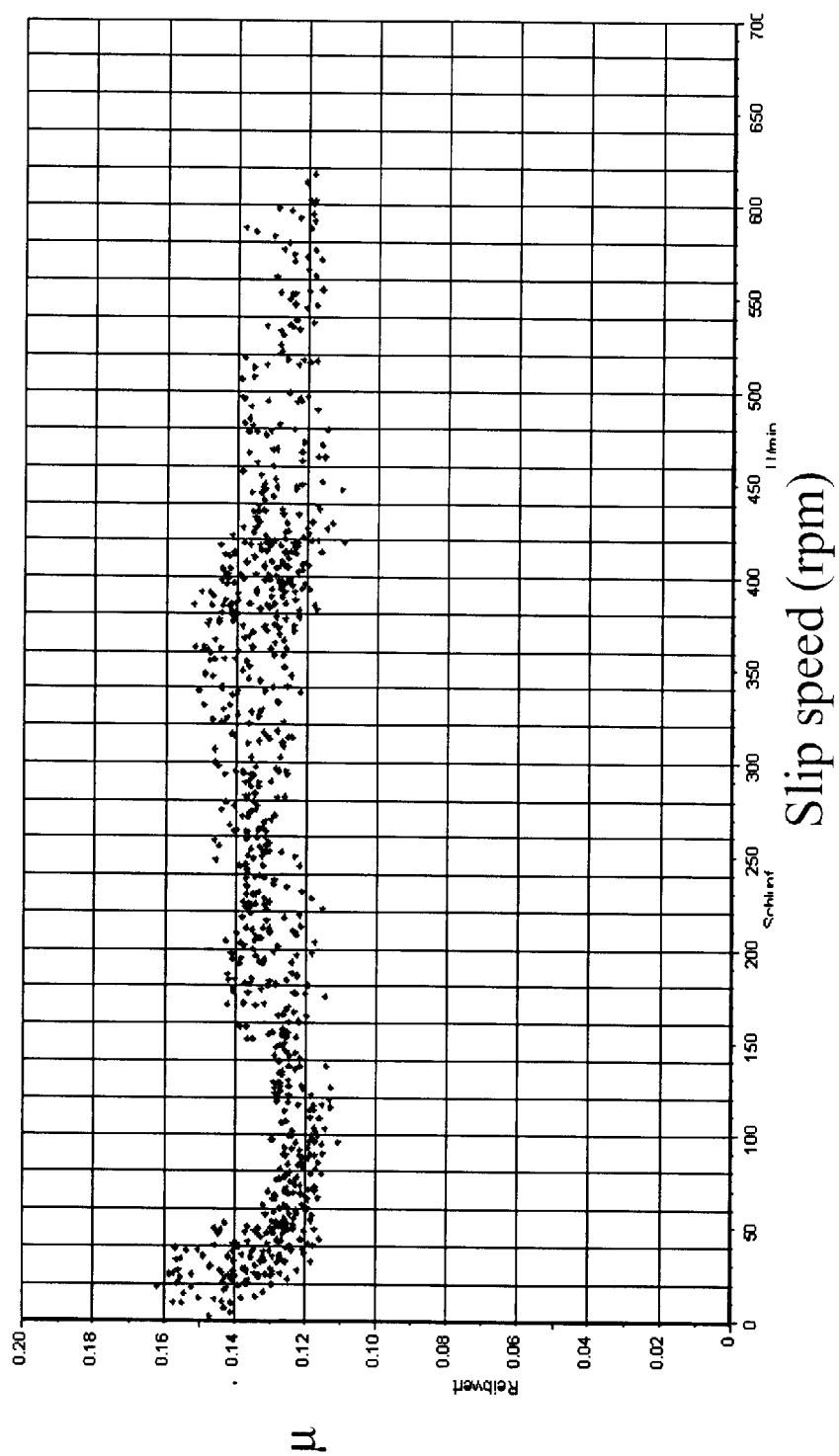
Figure 13B:
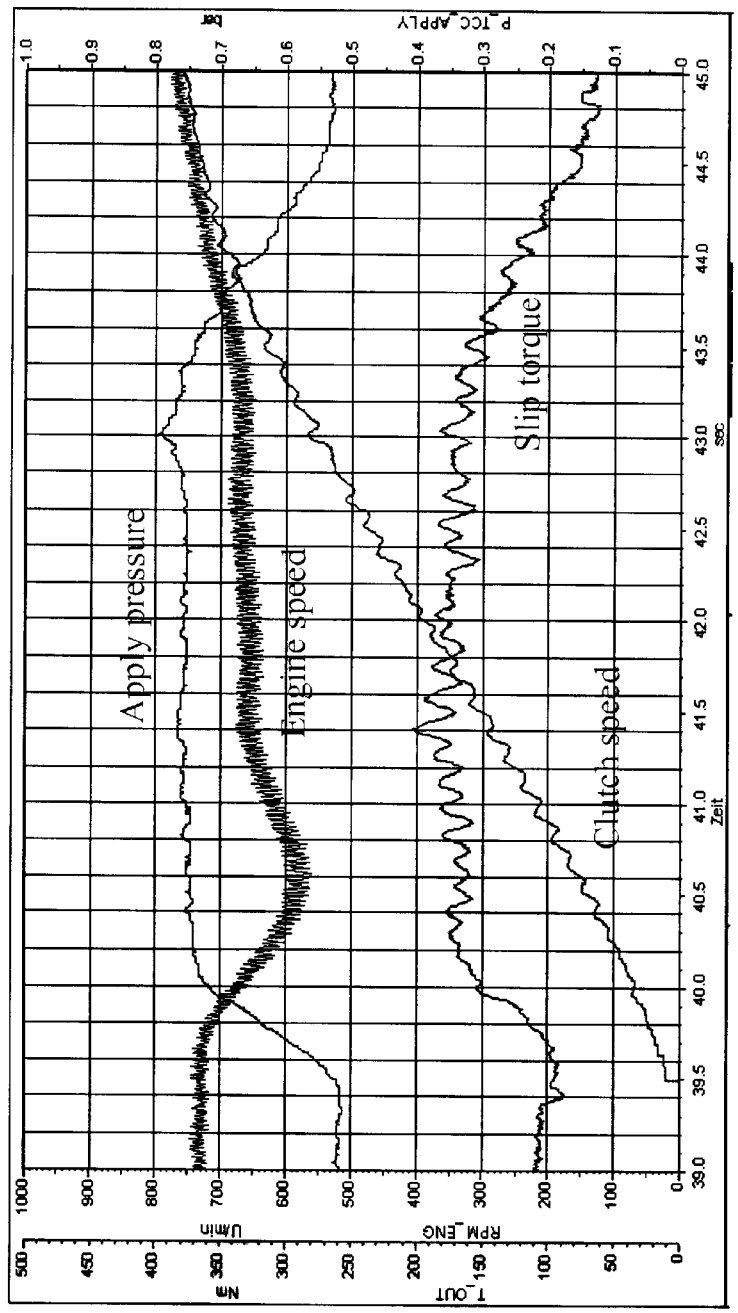

FIGS. 12 and 13 show the vehicle test results. The friction material BW exhibited flat $\mu$-v curves (stable p) and smooth output torque (free of vibration). The material M1, however, showed negative $\mu$-v slopes and output torque with significant vibrations (or shudder). These data confirm the superiority of the friction material BW over the material M1 in high-speed slip applications.

INDUSTRIAL APPLICABILITY

The present invention is useful as a high energy friction material for use with clutch plates, transmission bands, brake shoes, synchronizer rings, friction disks or system plates.

The above descriptions of the preferred and alternative embodiments of the present invention are intended to be illustrative and are not intended to be limiting upon the scope and content of the following claims.

We claim:

1. A friction material comprising a fibrous base material impregnated with at least one curable resin, the fibrous base material comprising a porous primary layer and one secondary layer, the secondary layer comprising silica friction modifying particles on at least one surface of the primary layer, the friction modifying particle ranging in size from about 0.5 to about 20 microns, the friction modifying particles being present at about 0.2 to about 20%, by weight, based on the weight of the fibrous base material, the friction modifying particles covering about 3% to about 90% of the surface area of the primary layer.

2. The friction material of claim 1, wherein the secondary layer comprises about 5% to about 15%, by weight, of friction modifying particles, based on the weight of the fibrous base material.

3. The friction material of claim 1, wherein the secondary layer comprises about 2% to about 5%, by weight, of silica particle friction modifying particles, based on the weight of the fibrous base material.

4. The friction material of claim 1, wherein the friction modifying particle size ranges from about 0.5 to about 20 microns.

5. The friction material of claim 4, wherein the friction modifying particles further include resin powders including phenolic resins, silicone resins, or epoxy resins and mixtures thereof; fully carbonized carbon powder or particles or partially carbonized powder or particles and mixtures thereof; and mixtures thereof.

6. The friction material of claim 1, wherein the fibrous base material defines pore diameters ranging in mean average size from about 2.0 to about 25 microns.

7. The friction material of claim 1, wherein the primary layer has readily available air voids of at least about 50%.

8. The friction material of claim 1, impregnated with a phenolic resin or a modified phenolic resin.

9. The friction material of claim 8, wherein the friction material comprises approximately 25 to about 60% resin, by weight.

10. The friction material of claim 1, impregnated with a mixture of a phenolic resin and a silicone resin wherein the amount of silicone resin in the mixture ranges from approximately 5 to approximately 80%, by weight, based on the weight of the mixture.

11. The friction material of claim 10, wherein the phenolic resin is present in a solvent material and the silicone resin is present in a solvent material which is compatible with the solvent material of the phenolic resin.

12. The friction material of claim 10, wherein the amount of silicone resin present in the silicone-phenolic resin mixture ranges from about 20 to about 25%, by weight, based on the weight of the mixture.

13. The friction material of claim 10, wherein the amount of silicone resin present in the silicone phenolic resin mixture ranges from about 15 to about 25%, by weight, based on the weight of the mixture.

14. The friction material of claim 8, wherein the modified phenolic resin comprises an epoxy phenolic resin.

15. The friction material of claim 14, wherein the amount of epoxy resin present in the epoxy phenolic resin ranges from about 5 to about 25%, by weight, based on the weight of the epoxy phenolic resin.

16. The friction material of claim 14, wherein the amount of epoxy resin present in the epoxy phenolic resin ranges from about 10 to about 15%, by weight, based on the weight of the epoxy phenolic resin.

17. A friction material comprising a fibrous base material impregnated with at least one curable resin, the fibrous base material comprising a porous primary layer and one secondary layer, the secondary layer comprising silica friction modifying particles on at least one surface of the primary layer, the friction modifying particle ranging in size from about 0.5 to about 20 microns, the friction modifying particles being present at about 0.2 to about 20%, by weight, based on the weight of the fibrous base material, the friction modifying particles covering about 3% to about 90% of the surface area of the primary layer, wherein the fibrous base material comprises a plurality of less fibrillated aramid fibers having a freeness of at least about 300 on the Canadian Standard Freeness (CSF) index, and optionally one or more of the following: cotton fibers, carbon fibers, carbon particles, and, at least one filler material.

18. The friction material of claim 17, wherein the less fibrillated aramid fibers have a freeness of about 430 to about 650 on the Canadian Standard Freeness index.

19. The friction material of claim 17, wherein the aramid fibers have average fiber lengths in the range of about 0.5 to about 10 mm.

20. The friction material of claim 17, wherein the filler comprises diatomaceous earth.

21. The friction material of claim 17, wherein the fibrous base layer comprises about 10 to about 50%, by weight, less fibrillated aramid fiber; about 10 to about 35%, by weight, carbon particles; about 5 to about 20%, by weight, cotton fibers; about 2 to about 15%, by weight, carbon fibers; and, about 10 to about 35%, by weight, filler material.

22. The friction material of claim 21, comprising in percent, by weight, about 38 to 40% less fibrillated aramid fibers, about 13 to about 15% carbon particles; about 10 to about 12% cotton fibers; about 4–6% carbon fibers; and about 28 to about 30% filler material.

23. A process for producing a friction material the steps of:
    forming a fibrous base material comprising aramid fibers,
    coating about 3% to about 90% of at least one surface of the porous fibrous base material with friction modifying particles comprising silica particles, the friction modifying particles being present at about 0.2 to about 20%, by weight, based on the weight of the fibrous base material,
    impregnating the coated fibrous base material with a phenolic resin, or phenolic-based resin mixture, and p1 thereafter, curing the impregnated fibrous base material at a predetermined temperature for a predetermined period of time.

24. The process of claim 23, in which the aramid fibers are mixed with carbon particles, cotton fibers, carbon fibers and at least one filler material to form the fibrous base material.

25. The process of claim 23, in which the friction modifying particles comprise silica particles; resin powders including phenolic, silicone or epoxy resins and mixtures thereof; fully carbonized carbon powder or particles or partially carbonized carbon powder or particles and mixtures thereof; and mixtures thereof.

26. A process for producing a friction material consisting of the steps of:
    coating about 3% to about 90% of at least one surface of a porous fibrous base material with friction modifying particles comprising silica particles, the friction modifying particles being present at about 0.2 to about 20%, by weight, based on the weight of the fibrous base material,
    impregnating the coated fibrous base material with a phenolic resin, or phenolic-based resin mixture, and
    thereafter, curing the impregnated fibrous base material at a predetermined temperature for a predetermined period of time.

27. The process of claim 26, in which the friction modifying particles range in size from about 0.5 to about 20 microns, the friction modifying particles covering about 3% to about 90% of the surface area of the primary layer; and,
    wherein the fibrous base material comprises a plurality of less fibrillated aramid fibers having a freeness of at least about 300 on the Canadian Standard Freeness (CSF) index, and optionally one or more of the following: cotton fibers, carbon fibers, carbon particles, and, at least one filler material.

28. The process of claim 27, in which the fibrous base material comprises a plurality of less fibrillated aramid fibers having a freeness of at least about 430 to about 650 on the Canadian Standard Freeness (CSF) index.

* * * * *